United States Patent [19]
Renfrew et al.

[11] 3,899,519
[45] Aug. 12, 1975

[54] 6-ARYLTHIO-1, 4,5-TRIHYDROXYANTHRAQUINONES

[75] Inventors: Edgar E. Renfrew, Lock Haven; Raouf Botros, Beech Creek, both of Pa.

[73] Assignee: American Aniline Products, Inc., Paterson, N.J.

[22] Filed: June 14, 1973

[21] Appl. No.: 370,041

[52] U.S. Cl.................................. 260/383; 8/39
[51] Int. Cl........................... C09b 1/02; C09b 1/14
[58] Field of Search..................................... 260/383

[56] References Cited
FOREIGN PATENTS OR APPLICATIONS
856,553  12/1960  United Kingdom................. 260/383
957,144  5/1964  United Kingdom................. 260/383

OTHER PUBLICATIONS
Chemical Abstracts, Vol. 60, 12147b, (1964).

*Primary Examiner*—Anton H. Sutto
*Assistant Examiner*—E. Jane Skelly
*Attorney, Agent, or Firm*—Armstrong, Nikaido & Wegner

[57] ABSTRACT

6-Arylthio-1,4,5-trihydroxyanthraquinones are produced in a facile manner via heating 6-chloro or bromo-1,4,5-trihydroxyanthraquinone with an arylthiol which compounds have been found to produce excellent Dyeings on polyester, in particular polyethylene terephthalate, in a bright reddish violet hue.

3 Claims, No Drawings

6-ARYLTHIO-1,4,5-TRIHYDROXYANTHRAQUINONES

BACKGROUND OF THE INVENTION

Considerable attention has been focused upon the azo and anthraquinone arts in the past few years in the search for new dyestuffs for polyester fabrics, particularly dyestuffs for polyethylene terephthalate. In recent years anthraquinones have been investigated which contain a sulfur substituent. Representative of recent efforts in this area are patents to Peter et al, U.S. Pat. No. 3,447,886, issued June 3, 1969 and Weaver et al, U.S. Pat. No. 3,689,501, issued Sept. 5, 1972. Both of these efforts were concerned with the preparation of heterocyclic substituted compounds.

We have now discovered a novel series of anthraquinone dyestuffs containing substituents derived from benzenethiol and substituted benzenethiols.

SUMMARY OF THE INVENTION

In accordance with the invention, there is provided a novel series of 6-arylthio-1,4,5-trihydroxyanthraquinones of the formula

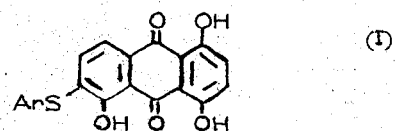
(I)

wherein

Ar is phenyl which is unsubstituted or substituted by a member selected from chloro, bromo, lower alkyl of 1-4 carbon atoms, methylthio, ethylthio, methoxy, ethoxy and nitro; naphthyl or methoxynaphthyl.

In accordance with a preferred aspect, there are provided compounds of the formula

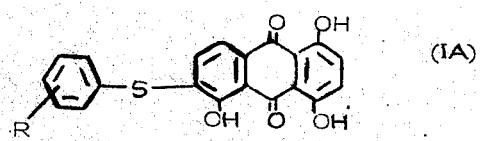
(IA)

Wherein R is hydrogen, chloro, bromo, methyl or ethyl.

In accordance with a second aspect of the invention there are provided violet-colored polyester fabric materials, which are obtained through the dyeing of a polyester fabric material with the 6-arylthio-1,4,5-trihydroxyanthraquinones (I) of the invention.

DETAILED DESCRIPTION OF THE INVENTION

The 6-arylthio-1,4,5-trihydroxyanthraquinones (I) are produced via heating a 6-halo-1,4,5-trihydroxyanthraquinone of the formula

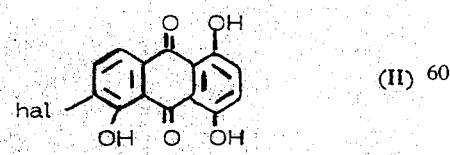
(II)

wherein hal is chloro or bromo with an arylthiol of the formula

ArSH (III)

wherein Ar is as defined above.

The above reaction between the 6-halo-1,4,5-trihydroxyanthraquinone (II) and the arylthiol is conducted advantageously in an organic solvent such as n-butanol or in an aqueous medium. The reaction is advantageously conducted in the presence of an acid binding agent such as sodium acetate or sodium hydroxide. The temperature generally is at least 90°C, and preferably, at a temperature of from about 95°C to about 125°C.

To prepare the product for application to the polyester substrates, it must be suitably dispersed. This may be done by any of several well-known methods: milling as in a ball-mill with dispersing agents such as lignin sulfonic acid materials for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and melting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye, when added to water with or without auxiliary agents, forms a near colloidal aqueous dispersion from which the aromatic polyester fiber or textile material is dyed in the conventional manner at 40°–100°C (104°–212°F) to give a colored fiber containing about 0.01–2 percent by weight dye (100% color basis).

Alternatively, dyeing may be accomplished without a carrier at temperatures of 100°–150°C under pressure. Also, the dye may be applied in patterns by conventional printing methods, if desired.

The dye can also be applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°–220°C (356°–428°F) are used for 30 to 90 seconds. If the fabric contains cotton or viscose rayon, apart from synthetic fibers there is little danger of damaging cellulosic portions, but if wool is present, the temperature must be kept within 180°–200°C and the time must be reduced to 30 seconds.

The following examples serve to further illustrate the invention:

EXAMPLE 1

6-Phenylthio-1,4,5-trihydroxyanthraquinone

A. Preparation of 6-phenylthio-1,4,5-trihydroxyanthraquinone.

To a 100 ml flask equipped with a stirrer, thermometer, heater and reflux condenser was charged 430.0 g. water, 43.6 g 6-chloro-1,4,5-trihydroxyanthraquinone, 15.0 g. sodium hydroxide, and 30.0 g. benzenethiol. The charge was stirred at the boiling temperature for twelve hours. Then was added enough glacial acetic acid (ca. 13–15 g) to bring near neutrality (i.e., neutral to Brilliant Yellow and to Congo Red). The charge was filtered hot, and the cake was washed with much hot water. It was then washed with 660 g. ethanol, denatured in three equal portions. It was washed again with hot water and then dried in an oven at 80°C. Yield 53.3 g. Theoretical yield, 54.6 g. Percentage residual chlorine, 0.1%

B. Dispersion and dyestesting results.

To a laboratory ball-mill was charged 40.0 g. product from part A, 40.0 g. "Marasperse N-22" (a sodium ligninsulfonate, commercially available) and 320.0 g. water. The mill which contains in addition to the chemicals charged a number of glass spheres approximately ½ inch diameter was turned until a suitable dispersion was achieved as shown by established filter tests.

Polyester was colored strongly in bright redish violet hues by established methods (carrier, pressure, thermofix). The dyeings showned excellent resistance to the action of light and showed virtually no sublimation at 350°F for one minute. Sublimation was also very good in the more vigorous 400°F test.

EXAMPLE 2

6-Chloro-1,4,5-trihydroxyanthraquinone

A. Preparation of 4,7-Dichlorochrysazin

To a 1 l. 4-neck round bottom flask equipped with a stirrer, a heater, a thermometer and a reflux condenser was charged 96.0 g. chrysazin, 400.0 g. nitrobenzene and 250.0 g. sulfuryl chloride. The mixture was heated slowly to the temperature at which liquid was condensed in the vertical condenser and returned to the flask (ca. 60°C). Heating was continued; the temperature internally rose to 85° over a period of time. The reaction mass was maintained at 85°–90°C while stirring for six hours. Heating was discontinued, and the mass allowed to come to room temperature while stirring. Stirring was discontinued, and the mass was allowed to stand for 16 hours. The solids were collected on a suction filter and washed with 120 g. ethanol, denatured, followed by water until the filtrate was no longer acidic. The cake was dried. It weighed 99. g. The theoretical yield is 123.6 g. Thus, 80%.

B. 6-chloro-1,4,5-trihydroxyanthraquinone.

To a 500 ml. 4-neck flask equipped with a stirrer, a thermometer and a drying tube was charged 600.0 g. sulfuric acid, 98%, and 42.0 g. boric acid. The mixture was warmed to 60°C and stirred until complete solution was achieved. Then there was added 93.0 g. 4,7-dichlorochrysazin. The reaction mass was heated to 140°C and maintained at this temperature for seven hours. It was then allowed to cool while stirring to room temperature, whereupon it was drowned into 3000 g. water.

The drowning mass was heated to 85°C and stirred at that temperature for 30 minutes. It was then filtered hot. The cake was washed free of acid with water, and dried.

Dry weight, 88 g. Theoretical yield, 87.0 g.

C. 4,6-Dichloroanthrarufin

This is prepared similar to the manner described in part A of this example by starting with an equal weight of anthrarufin instead of chrysazin. Hydrolysis of the dichloroanthrarufin by the method of B (this example) yields 6-chloro-1,4,5-trihydroxyanthraquinone identical with that obtained from chrysazin.

EXAMPLE 3

Substitution of an equimolar amount of p-toluenethiol for the benzenethiol of Example 1, otherwise following the procedures of Example 1, yields the compound 6-(4'-tolylthio)-1,4,5-trihydroxyanthraquinone. This compound may be used to dye polyethylene terephthalate in accordance with the procedure of Example 1. The properties of the dyed goods are similar to those of the product of Example 1.

EXAMPLE 4

In order to produce 6-(4'-chloro)-1,4,5-trihydroxyanthraquinone, an equimolar amount of p-chlorobenzenethiol is substituted for the benzenethiol of Example 1. The resultant compound provides bright violet colorations on polyethylene terephthalate when the dyeing procedure of Example I is followed.

EXAMPLES 5–18

In similar manner, 6-chloro-1,4,5-trihydroxyanthraquinone and the following benzenethiols yield products which dye polyethylene terephthalate in bright violet hues of excellent properties:

Example 5 o-methylthiobenzenethiol
Example 6 p-methylthiobenzenethiol
Example 7 p-ethylbenzenethiol
Example 8 2,4-dichlorobenzenethiol
Example 9 4-chloro-2-nitrobenzenethiol
Example 10 p-bromobenzenethiol
Example 11 p-t-butylbenzenethiol
Example 12 p-ethoxybenzenethiol
Example 13 m-chlorobenzenethiol
Example 14 o-isopropylbenzenethiol
Example 15 m-nitrobenzenethiol
Example 16 1-naphthalenethiol
Example 17 2-naphthalenethiol
Example 18 2-methoxy-1-naphthalenethiol

What is claimed is:

1. A compound of the formula

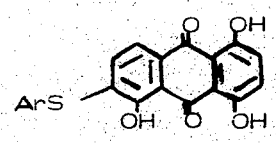

wherein Ar is phenyl which is unsubstituted or substituted
    by a member selected from chloro, bromo, lower alkyl of 1–4 carbon atoms, methylthio, ethylthio, methoxy, ethoxy and nitro; naphthyl or methoxynaphthyl.
2. A compound of claim 1 of the formula
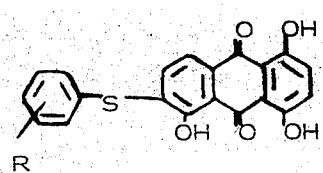
wherein R is hydrogen, chloro, bromo, methyl or ethyl.
3. The compound of claim 2 of the formula
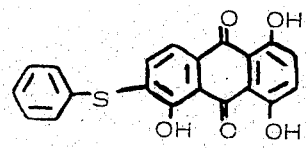
* * * * *